US012659917B2

(12) United States Patent
Reddy et al.

(10) Patent No.: US 12,659,917 B2
(45) Date of Patent: Jun. 16, 2026

(54) SELECTING BETWEEN RAY TRACING AND NON-RAY TRACING CHANNEL MODELS FOR POSITIONING

(71) Applicant: QUALCOMM Incorporated, San Diego, CA (US)

(72) Inventors: Varun Amar Reddy, San Diego, CA (US); Mohammed Ali Mohammed Hirzallah, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 18/594,374

(22) Filed: Mar. 4, 2024

(65) Prior Publication Data

US 2025/0280383 A1     Sep. 4, 2025

(51) Int. Cl.
| | |
|---|---|
| *H04W 64/00* | (2009.01) |
| *G01S 5/02* | (2010.01) |
| G01S 5/24 | (2006.01) |
| G01S 5/26 | (2006.01) |
| H04W 76/15 | (2018.01) |

(52) U.S. Cl.
CPC ........... *H04W 64/00* (2013.01); *G01S 5/0218* (2020.05); *G01S 5/0268* (2013.01)

(58) Field of Classification Search
None
See application file for complete search history.

(56) References Cited

U.S. PATENT DOCUMENTS

| | | | |
|---|---|---|---|
| 2007/0177680 A1 | 8/2007 | Green et al. | |
| 2010/0315289 A1 | 12/2010 | Nurmela et al. | |
| 2017/0099580 A1 | 4/2017 | Ko | |
| 2022/0103272 A1 * | 3/2022 | Dietrich | H04W 72/046 |
| 2024/0179665 A1 * | 5/2024 | Akkarakaran | H04W 64/00 |
| 2024/0298143 A1 * | 9/2024 | Zorgui | H04W 4/029 |

FOREIGN PATENT DOCUMENTS

| | | | | | |
|---|---|---|---|---|---|
| CN | | 101014010 B | * | 5/2010 | |
| CN | | 116234000 A | * | 6/2023 | H04W 24/02 |
| CN | | 117440311 A | * | 1/2024 | G06N 3/09 |
| CN | | 117498953 A | * | 2/2024 | G06N 3/0475 |
| WO | WO-2023098661 A1 | | | 6/2023 | |
| WO | WO-2024014921 A1 | | | 1/2024 | |

OTHER PUBLICATIONS

International Search Report and Written Opinion—PCT/US2025/011425—ISA/EPO—Apr. 22, 2025.

* cited by examiner

*Primary Examiner* — Venkat Perungavoor
(74) *Attorney, Agent, or Firm* — QUALCOMM Incorporated

(57) ABSTRACT

Disclosed are techniques for communication. In an aspect, an apparatus determines, based on one or more criteria, to use a non-ray tracing channel model, instead of a ray-tracing-based channel model, to model a wireless channel profile between a user equipment (UE) and one or more network nodes, and performs one or more positioning operations associated with the UE and the one or more network nodes based on the wireless channel profile between the UE and the one or more network nodes modeled by the non-ray tracing channel model.

20 Claims, 12 Drawing Sheets

Apparatus

Determine, based on one or more criteria, to use a low-computenon-ray tracing channel model, instead of a ray-tracing-based channel model, to model a wireless channel profile between a user equipment (UE) and one or more network nodes — 810

Perform one or more positioning operations associated with the UE and the one or more network nodes based on the wireless channel profile between the UE and the one or more network nodes modeled by the non-ray tracing low-compute channel model — 820

Figure 5:
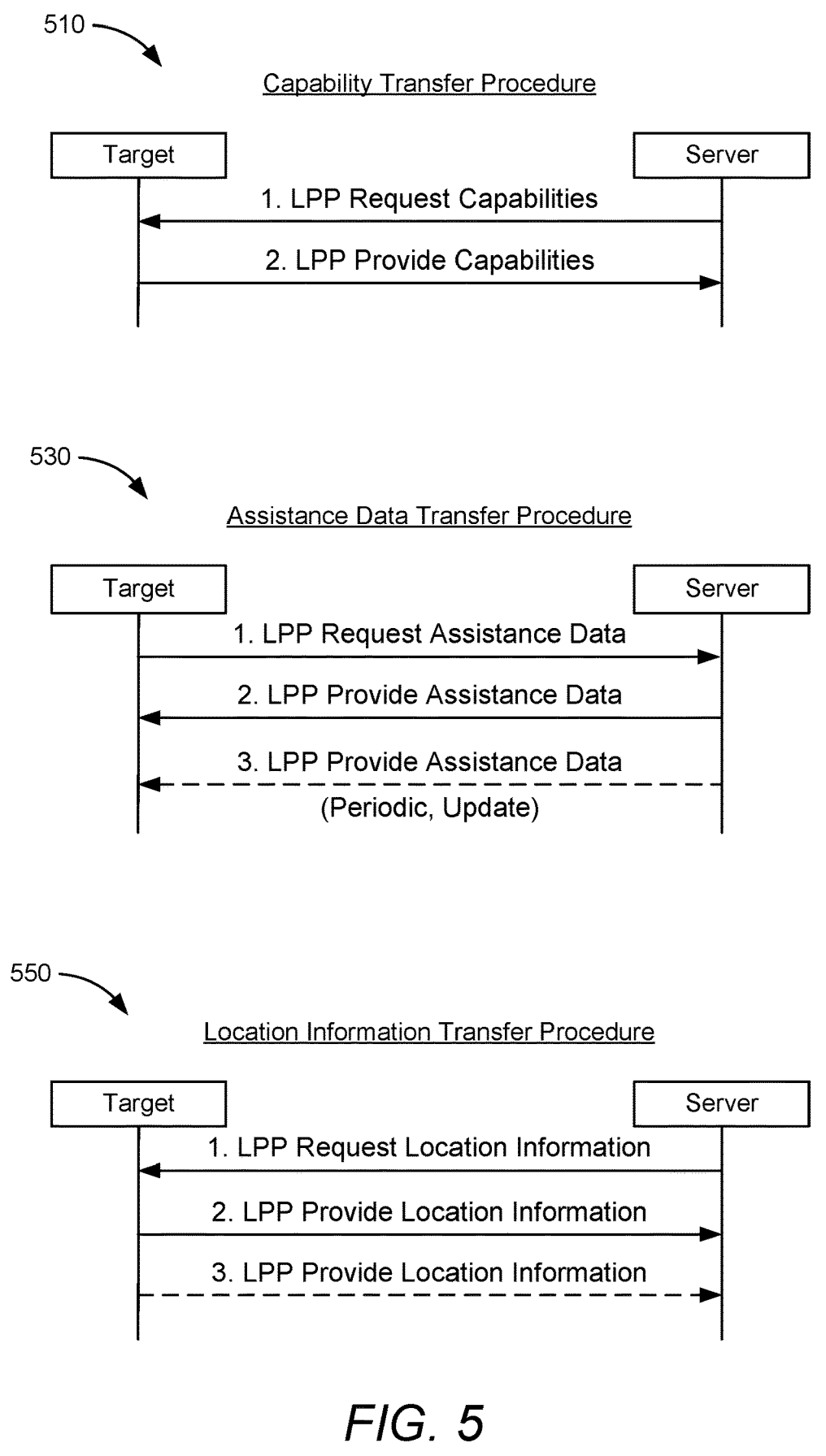

510 ⟍

Capability Transfer Procedure

| Target | | Server |

1. LPP Request Capabilities

2. LPP Provide Capabilities

530 ⟍

Assistance Data Transfer Procedure

| Target | | Server |

1. LPP Request Assistance Data

2. LPP Provide Assistance Data

3. LPP Provide Assistance Data
(Periodic, Update)

550 ⟍

Location Information Transfer Procedure

| Target | | Server |

1. LPP Request Location Information

2. LPP Provide Location Information

3. LPP Provide Location Information

⊘ Points where ray tracing is used

◯ Points where non-ray tracing is used

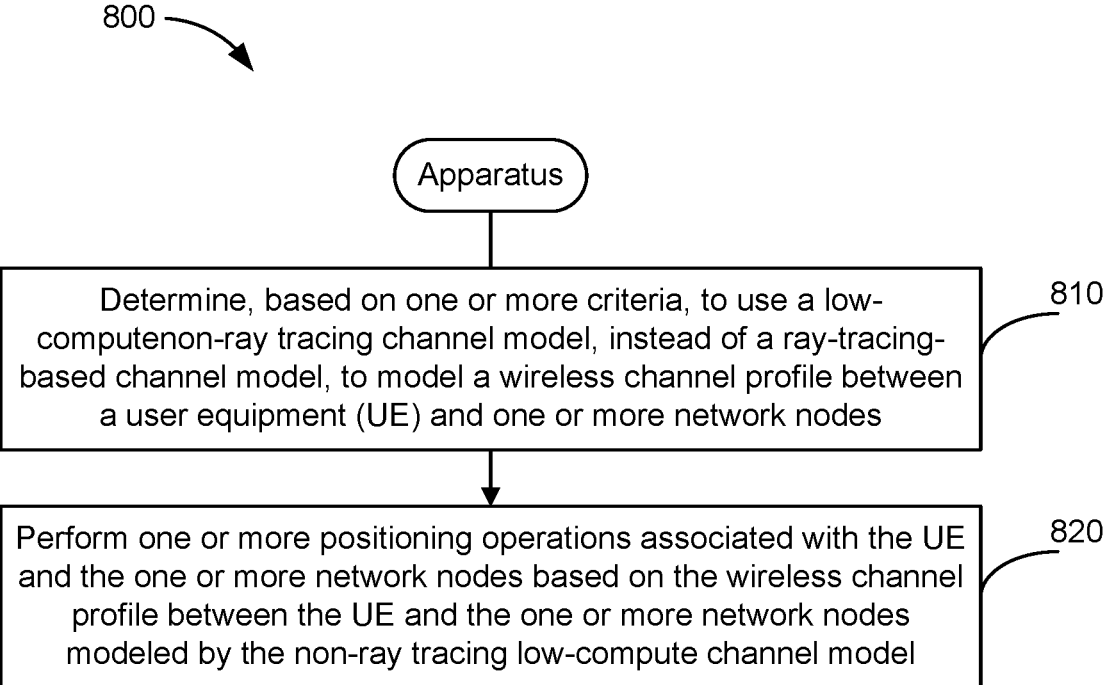

800

Apparatus

Determine, based on one or more criteria, to use a low-computenon-ray tracing channel model, instead of a ray-tracing-based channel model, to model a wireless channel profile between a user equipment (UE) and one or more network nodes — 810

Perform one or more positioning operations associated with the UE and the one or more network nodes based on the wireless channel profile between the UE and the one or more network nodes modeled by the non-ray tracing low-compute channel model — 820

*FIG. 8*

SELECTING BETWEEN RAY TRACING AND NON-RAY TRACING CHANNEL MODELS FOR POSITIONING

BACKGROUND OF THE DISCLOSURE

1. Field of the Disclosure

Aspects of the disclosure relate generally to wireless technologies.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of communication performed by an apparatus includes determining, based on one or more criteria, to use a non-ray tracing channel model, instead of a ray-tracing-based channel model, to model a wireless channel profile between a user equipment (UE) and one or more network nodes; and performing one or more positioning operations associated with the UE and the one or more network nodes based on the wireless channel profile between the UE and the one or more network nodes modeled by the non-ray tracing channel model.

In an aspect, an apparatus includes one or more memories; and one or more processors communicatively coupled to the one or more memories, the one or more processors, either alone or in combination, configured to: determine, based on one or more criteria, to use a non-ray tracing channel model, instead of a ray-tracing-based channel model, to model a wireless channel profile between a user equipment (UE) and one or more network nodes; and perform one or more positioning operations associated with the UE and the one or more network nodes based on the wireless channel profile between the UE and the one or more network nodes modeled by the non-ray tracing channel model.

In an aspect, an apparatus includes means for determining, based on one or more criteria, to use a non-ray tracing channel model, instead of a ray-tracing-based channel model, to model a wireless channel profile between a user equipment (UE) and one or more network nodes; and means for performing one or more positioning operations associated with the UE and the one or more network nodes based on the wireless channel profile between the UE and the one or more network nodes modeled by the non-ray tracing channel model.

In an aspect, a non-transitory computer-readable medium stores computer-executable instructions that, when executed by an apparatus, cause the apparatus to: determine, based on one or more criteria, to use a non-ray tracing channel model, instead of a ray-tracing-based channel model, to model a wireless channel profile between a user equipment (UE) and one or more network nodes; and perform one or more positioning operations associated with the UE and the one or more network nodes based on the wireless channel profile between the UE and the one or more network nodes modeled by the non-ray tracing channel model.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 5 illustrates an example Long-Term Evolution (LTE) positioning protocol (LPP) capability transfer procedure, assistance data transfer procedure, and location information transfer procedure between a target device and a location server, according to aspects of the disclosure.

FIG. 8 illustrates an example method of communication, according to aspects of the disclosure.

DETAILED DESCRIPTION

Figure 1:
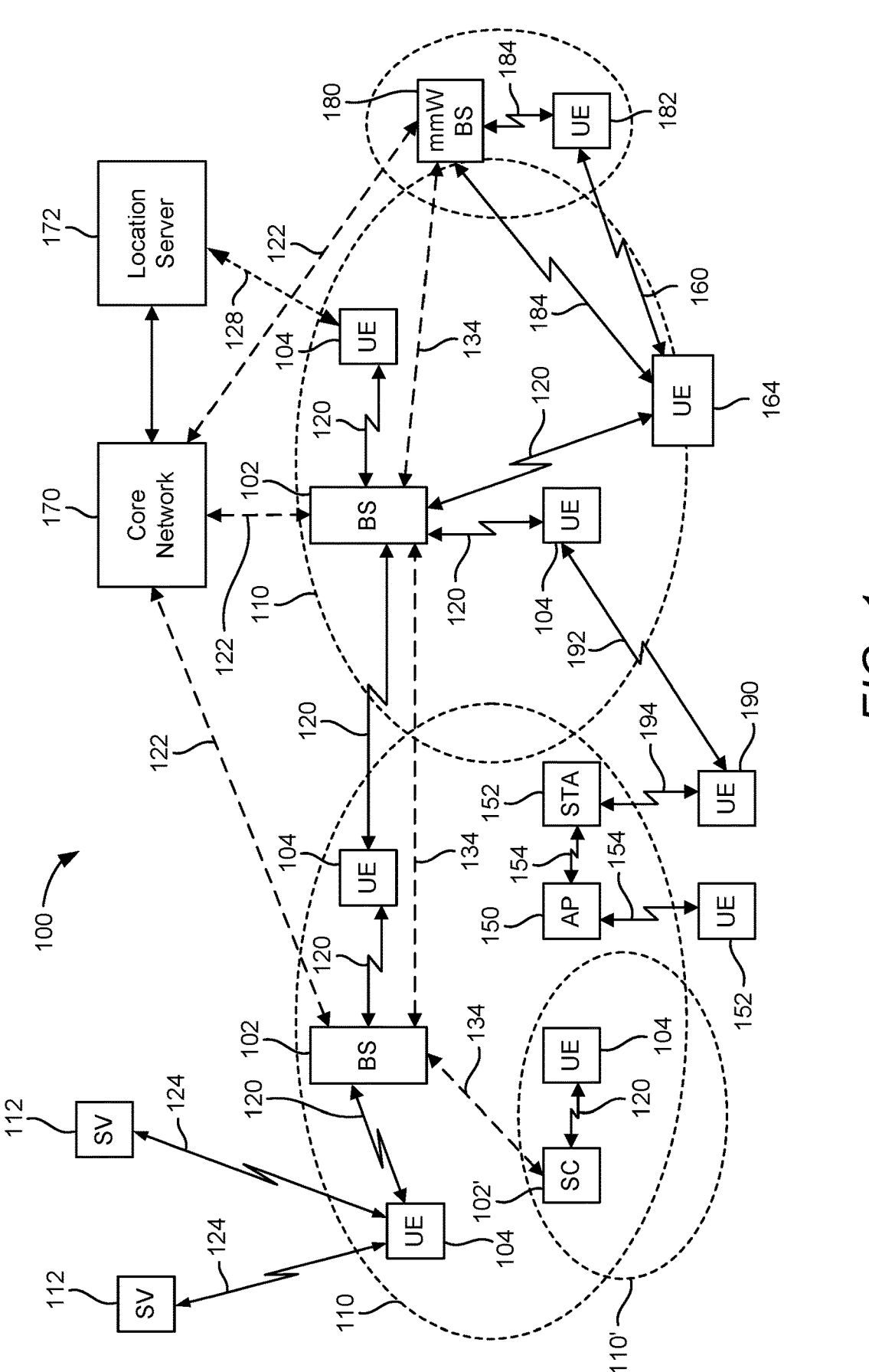
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to wireless channel modelling. Some aspects more specifically relate to selecting between ray tracing and non-ray tracing channel models. In some examples, a selection entity may determine whether to use a ray tracing or non-ray tracing (e.g., low-compute) channel model based on prior knowledge of the environment layout, the potential impact of the channel profile, line-of-sight (LoS) detection, scattering in the environment, materials of obstructions, the number of access points and their geometric dilution of precision (GDOP), desired positioning accuracy, desired positioning rate, or any combination thereof. In some examples, the non-ray tracing channel model may reuse previous ray tracing-based channel profiles and introduce randomness to the current channel profile. In some examples, the selection entity may also indicate an area identifier validity criterion, a time validity criterion, and/or the like.

Particular aspects of the subject matter described in this disclosure can be implemented to realize one or more of the following potential advantages. In some examples, by selecting and using a non-ray tracing channel model in certain conditions, the described techniques can be used to reduce the computational requirements of generating channel profiles.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multipleoutput (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link)

transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2A:
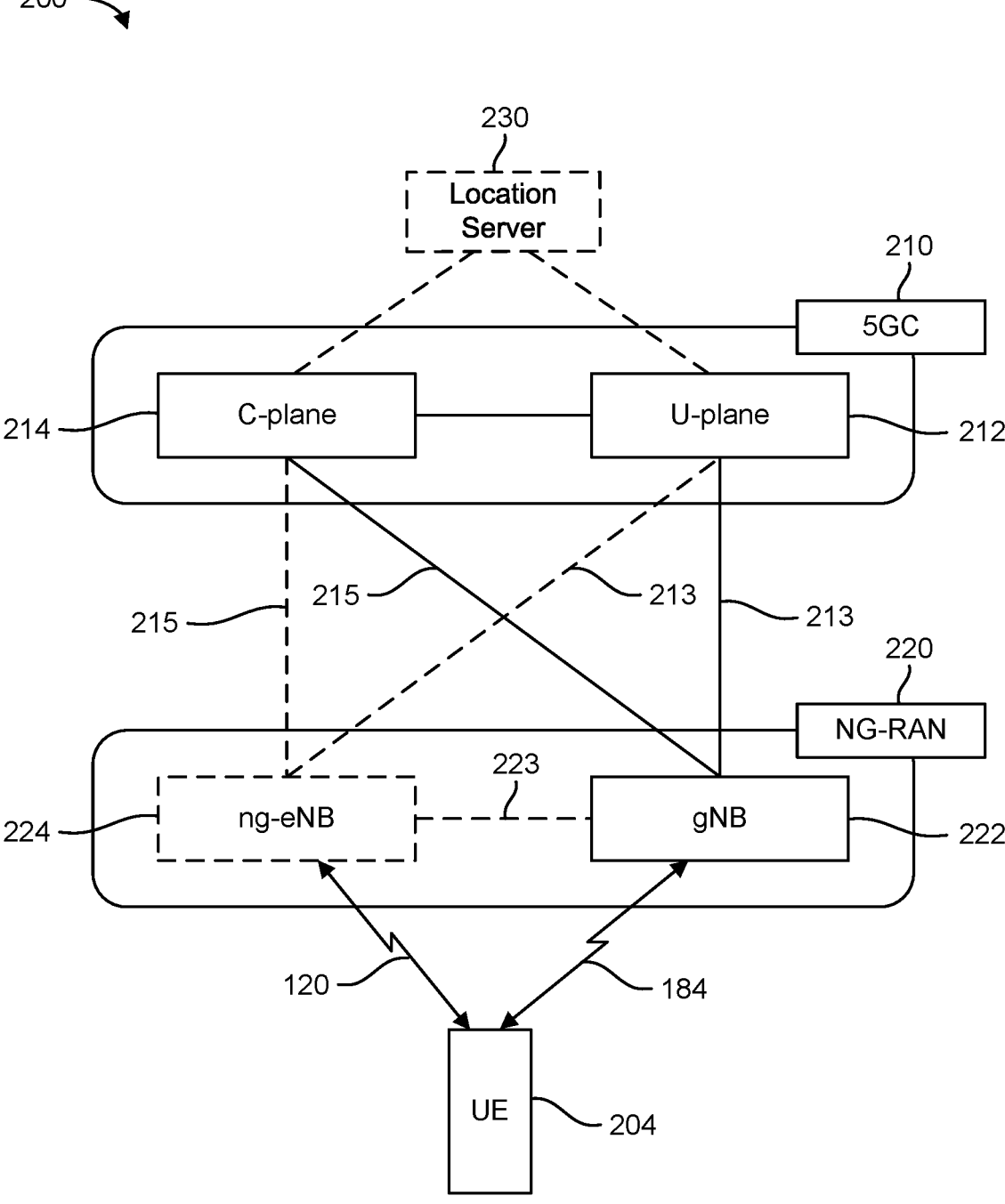
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
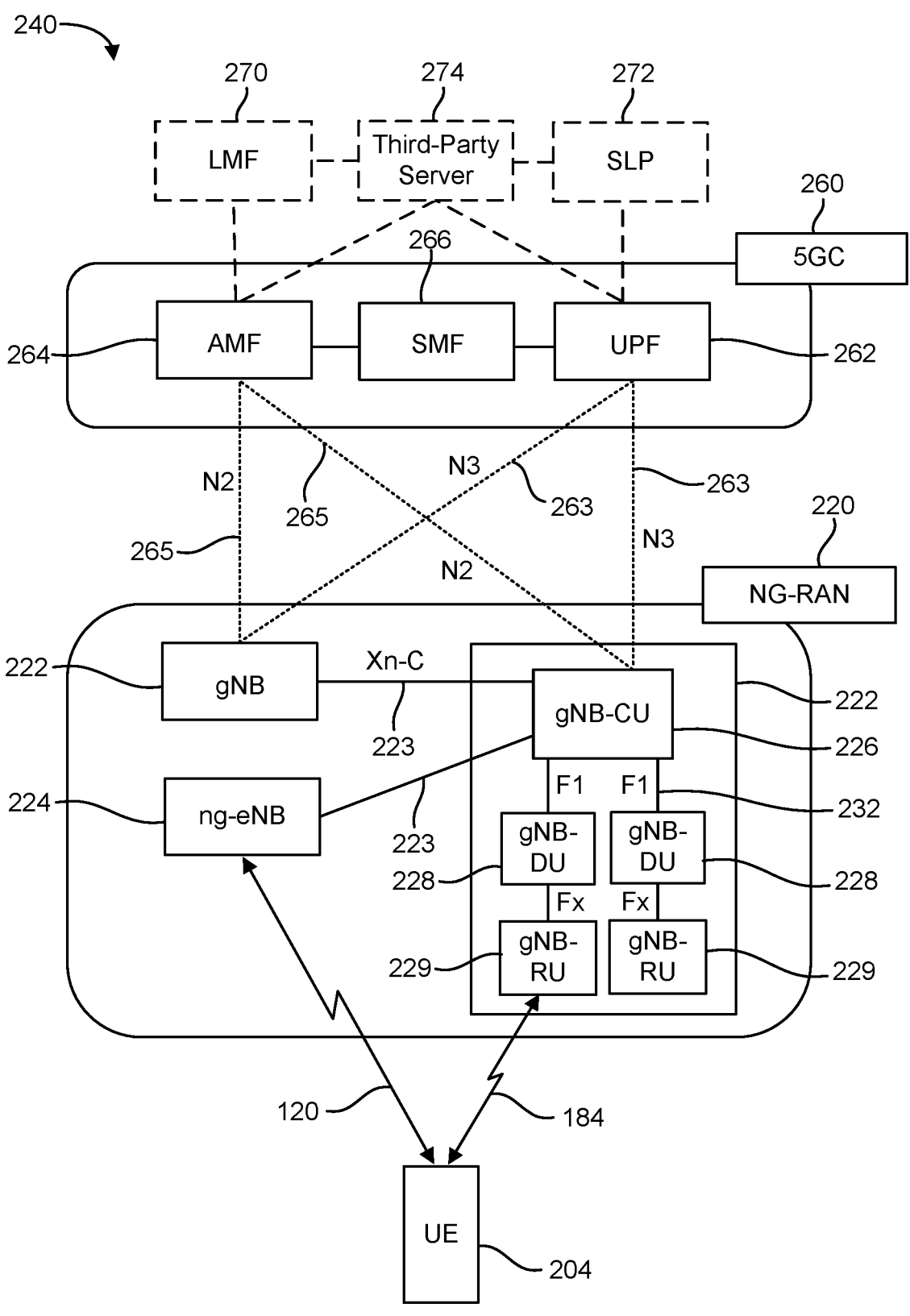

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (CNB), NR base station, 5G NB, AP, TRP, cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
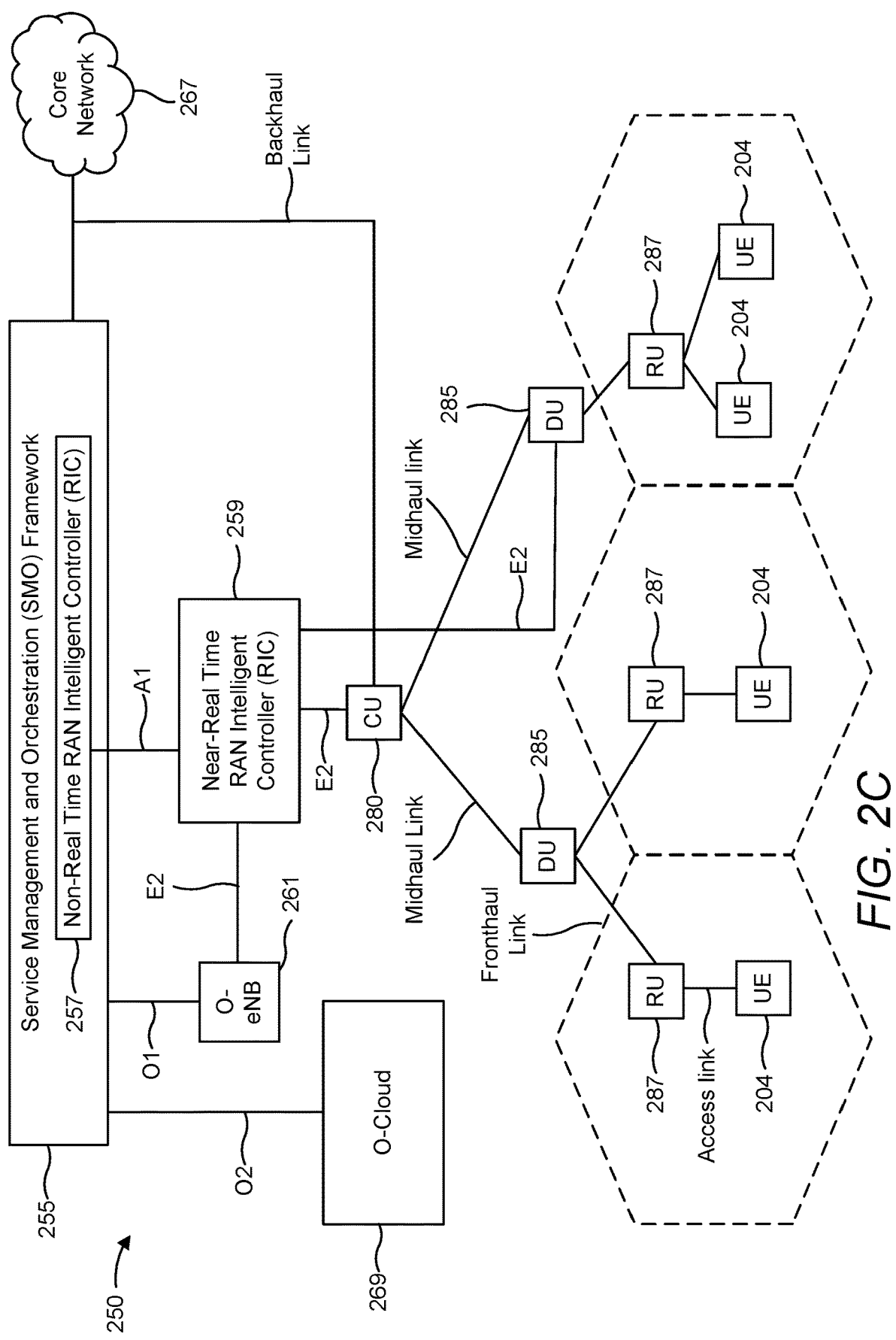

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUS 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
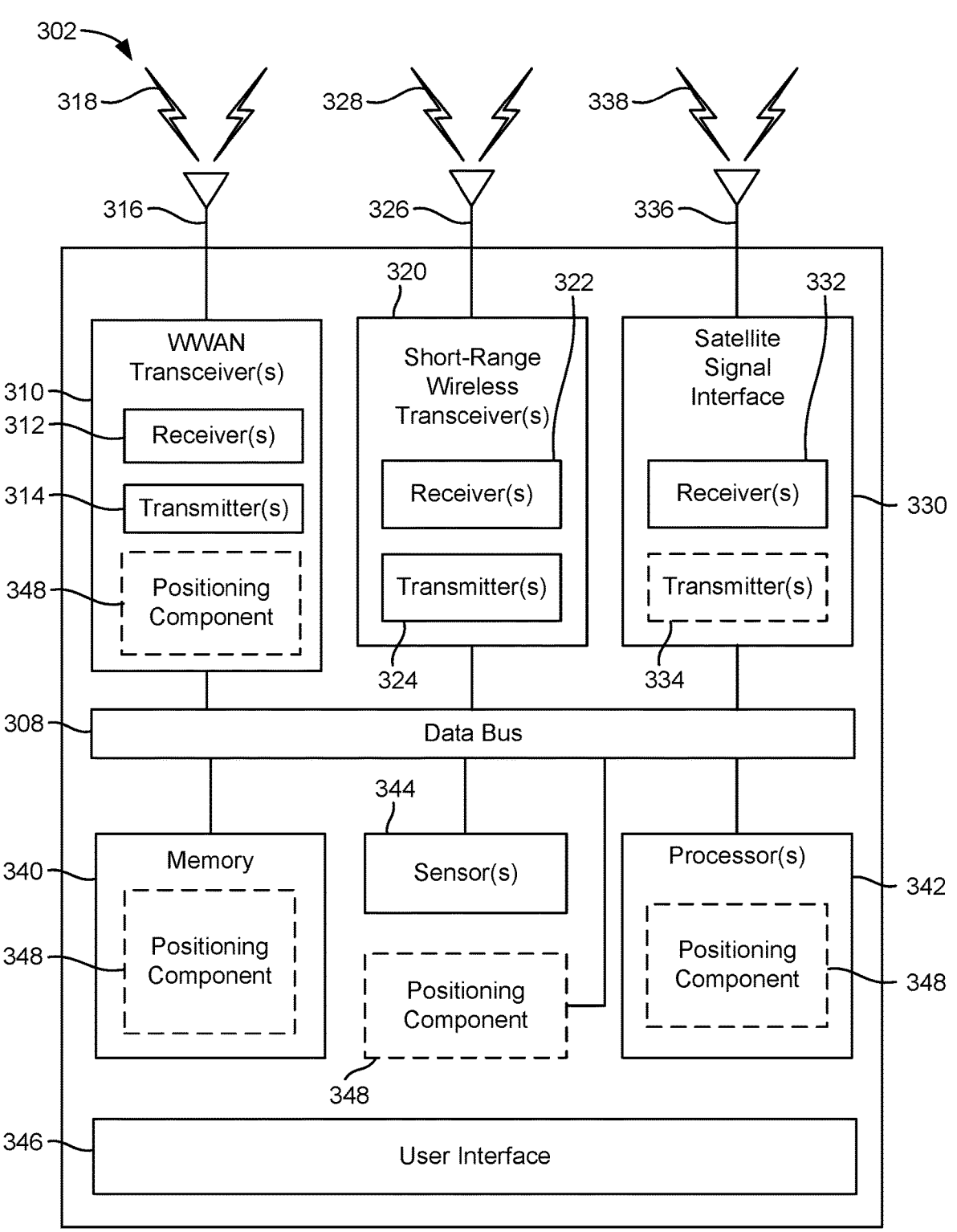
FIGS. 3A, 3B, and 3C are simplified block diagrams of several sample aspects of components that may be employed in a user equipment (UE), a base station, and a network entity, respectively, and configured to support communications as taught herein.
Figure 3B:
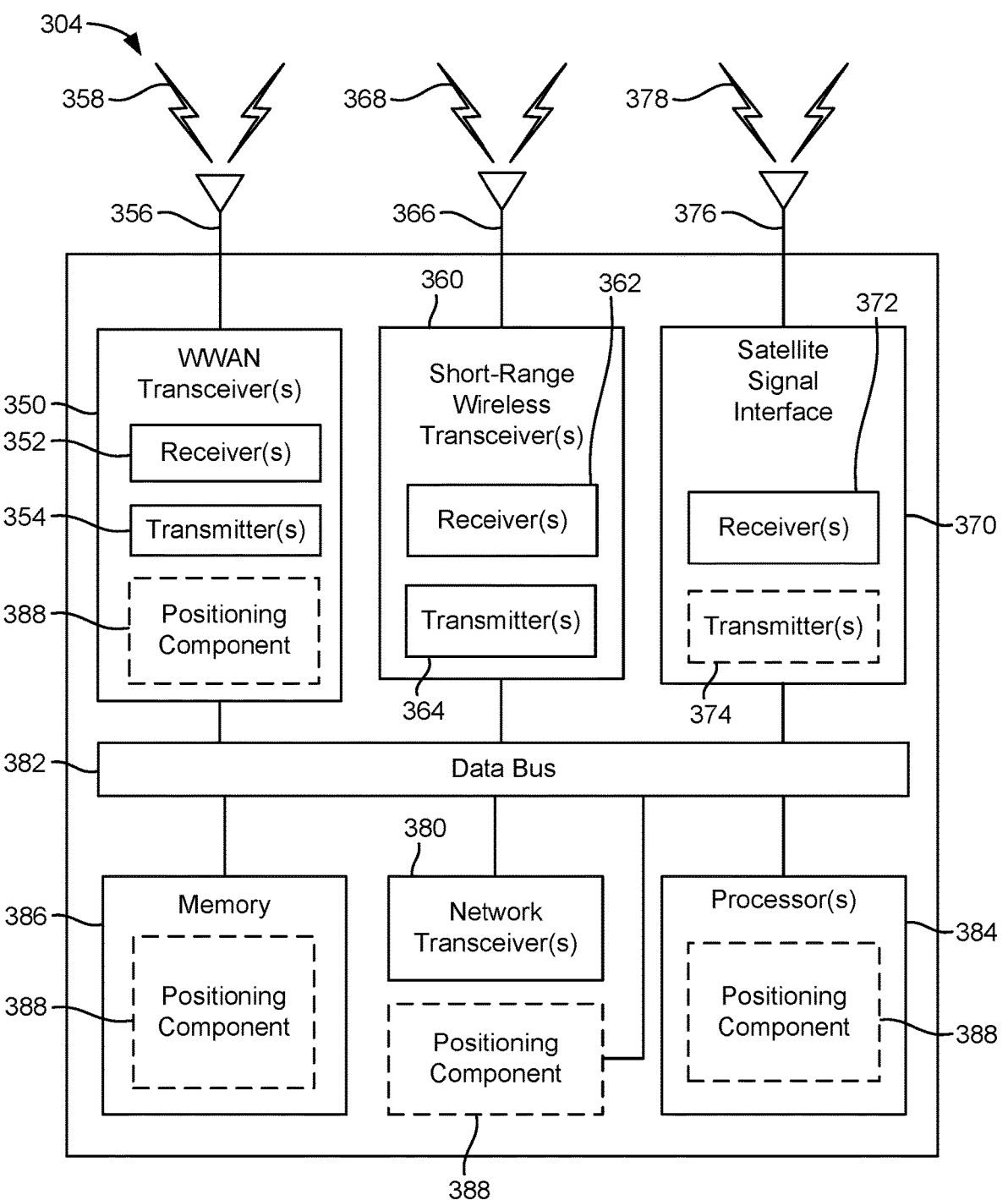
Figure 3C:
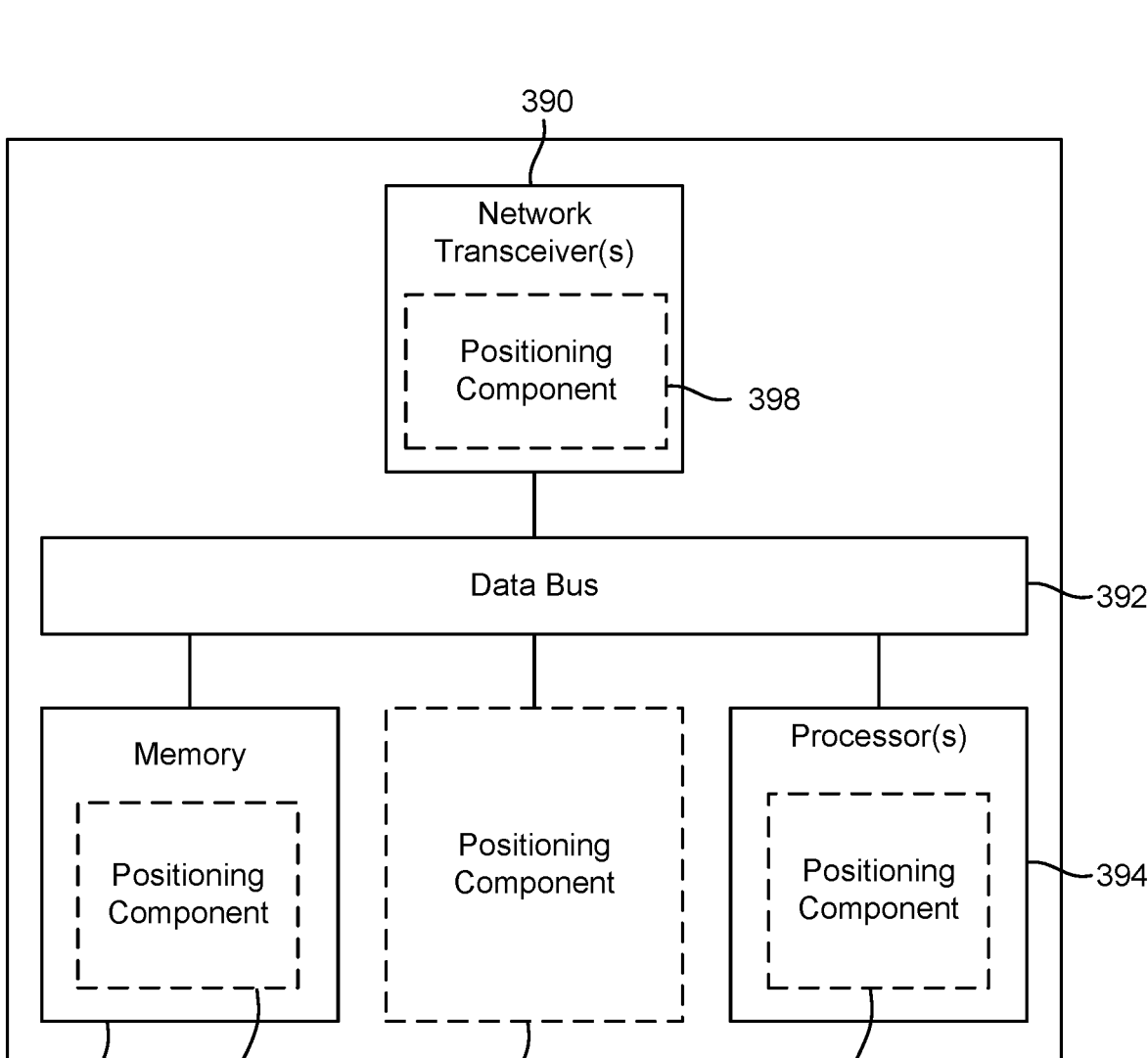

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal interfaces 330 and 370, which each include one or more satellite signal receivers 332 and 372, respectively, and may optionally include one or more satellite signal transmitters 334 and 374, respectively. In some cases, the base station 304 may be a terrestrial base station that may communicate with space vehicles (e.g., space vehicles 112) via the satellite signal interface 370. In other cases, the base station 304 may be a space vehicle (or other non-terrestrial entity) that uses the satellite signal interface 370 to communicate with terrestrial networks and/or other space vehicles.

The satellite signal receivers 332 and 372 may be connected to one or more antennas 336 and 376, respectively, and may provide means for receiving and/or measuring satellite positioning/communication signals 338 and 378, respectively. Where the satellite signal receiver(s) 332 and 372 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS) signals, etc. Where the satellite signal receiver(s) 332 and 372 are non-terrestrial network (NTN) receivers, the satellite positioning/communication signals 338 and 378 may be communication signals (e.g., carrying control and/or user data) originating from a 5G network. The satellite signal receiver(s) 332 and 372 may comprise any suitable hardware and/or software for receiving and processing satellite positioning/communication signals 338 and 378, respectively. The satellite signal receiver(s) 332 and 372 may request information and operations as appropriate from the other systems, and, at least in some cases, perform calculations to determine locations of the UE 302 and the base station 304, respectively, using measurements obtained by any suitable satellite positioning system algorithm.

The optional satellite signal transmitter(s) 334 and 374, when present, may be connected to the one or more antennas 336 and 376, respectively, and may provide means for transmitting satellite positioning/communication signals 338 and 378, respectively. Where the satellite signal transmitter(s) 374 are satellite positioning system transmitters, the satellite positioning/communication signals 378 may be GPS signals, GLONASS® signals, Galileo signals, Beidou signals, NAVIC, QZSS signals, etc. Where the satellite signal transmitter(s) 334 and 374 are NTN transmitters, the satellite positioning/communication signals 338 and 378 may be communication signals (e.g., carrying control and/or user data) originating from a 5G network. The satellite signal transmitter(s) 334 and 374 may comprise any suitable hardware and/or software for transmitting satellite positioning/communication signals 338 and 378, respectively. The satellite signal transmitter(s) 334 and 374 may request information and operations as appropriate from the other systems.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 342, 384, and 394, respectively, for providing functionality relating to, for example, wireless communication, and for providing other processing functionality. The processors 342, 384, and 394 may therefore provide means for processing, such as means for determining, means for calculating, means for receiving, means for transmitting, means for indicating, etc. In an aspect, the processors 342, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 348, 388, and 398, respectively. The positioning component 348, 388, and 398 may be hardware circuits that are part of or coupled to the processors 342, 384, and 394, respectively, that, when executed, cause the UE 302, the base station 304, and the network entity 306 to perform the functionality described herein. In other aspects, the positioning component 348, 388, and 398 may be external to the processors 342, 384, and 394 (e.g., part of a modem processing system, integrated with another processing system, etc.). Alternatively, the positioning component 348, 388, and 398 may be memory modules stored in the memories 340, 386, and 396, respectively, that, when executed by the processors 342, 384, and 394 (or a modem processing system, another processing system, etc.), cause the UE 302, the base station 304, and the network entity 306 to perform the functionality described herein. FIG. 3A illustrates possible locations of the positioning component 348, which may be, for example, part of the one or more WWAN transceivers 310, the memory 340, the one or more processors 342, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 342 to provide means for sensing or detecting movement and/or orientation information that is independent of motion data derived from signals received by the one or more WWAN transceivers 310, the one or more short-range wireless transceivers 320, and/or the satellite signal interface 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 342. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 342, which implements Layer-3 (L3) and Layer-2 (L2) functionality.

In the downlink, the one or more processors 342 provides demultiplexing between transport and logical channels, packet reassembly, deciphering, header decompression, and control signal processing to recover IP packets from the core network. The one or more processors 342 are also responsible for error detection.

Similar to the functionality described in connection with the downlink transmission by the base station 304, the one or more processors 342 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or personal computer (PC) or laptop may have Wi-Fi and/or BLUETOOTH® capability without cellular capability), or may omit the short-range wireless transceiver(s) 320 (e.g., cellular-only, etc.), or may omit the satellite signal interface 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal interface 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 308, 382, and 392, respectively. In an aspect, the data buses 308, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 308, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 342, 384, 394, the transceivers 310, 320, 350, and 360, the memories 340, 386, and 396, the positioning component 348, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

Figure 4:
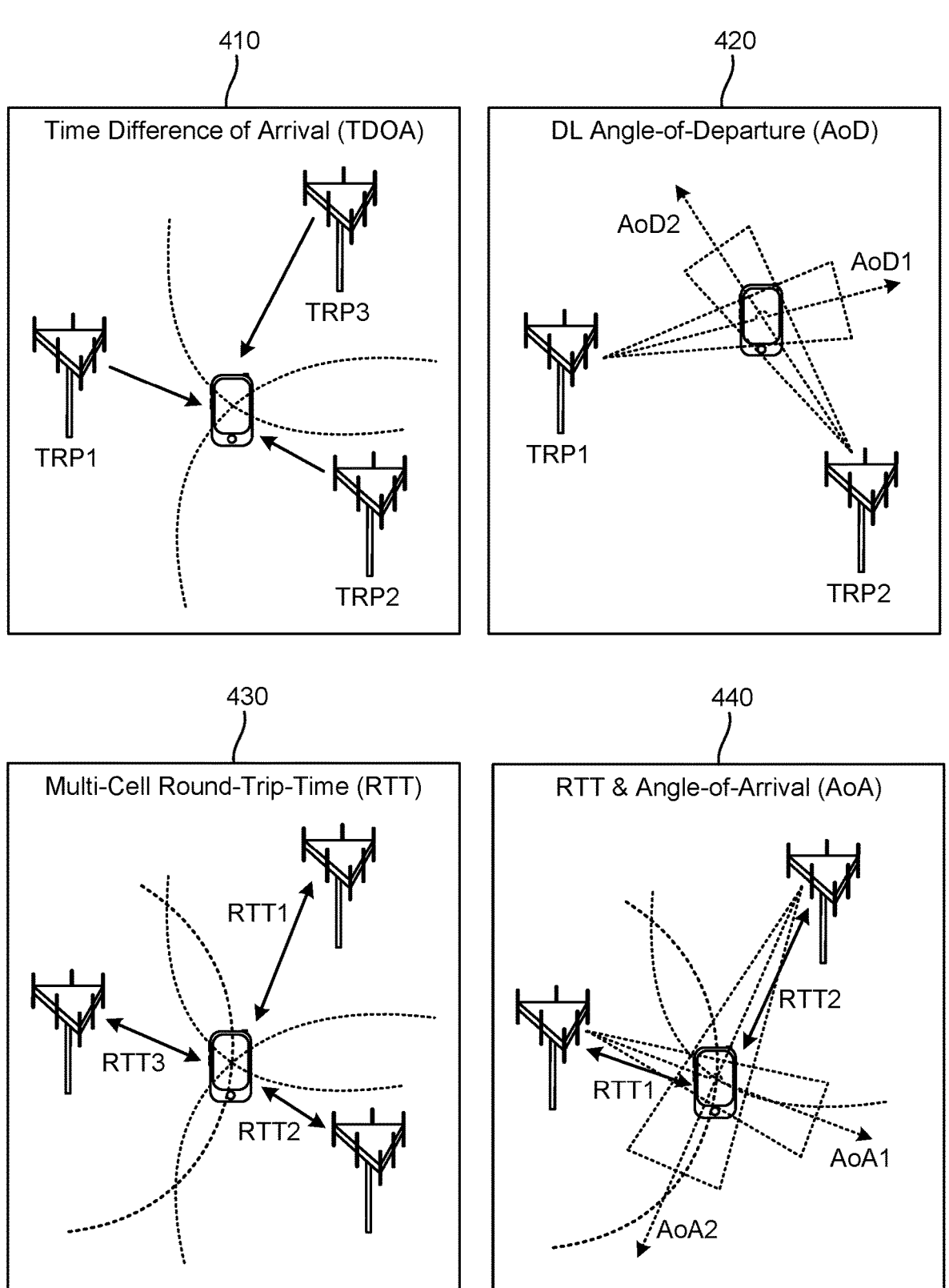
FIG. 4 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. In an OTDOA or DL-TDOA positioning procedure, illustrated by scenario 410, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 420, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 430, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 440.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Long-Term Evolution (LTE) positioning protocol (LPP) is used point-to-point between a location server (e.g., LMF 270) and a target device (e.g., a UE) in order to position the target device using position-related measurements obtained by one or more reference sources (physical entities or parts of physical entities that provide signals that can be measured by a target device in order to obtain the location of the target device). An LPP session is used between a location server and a target device in order to obtain location-related measurements or a location estimate or to transfer assistance data. Currently, a single LPP session is used to support a single location request and multiple LPP sessions can be used between the same endpoints to support multiple different location requests. Each LPP session comprises one or more LPP transactions (or procedures), with each LPP transaction performing a single operation (capability exchange, assistance data transfer, or location information transfer). Each LPP transaction involves the exchange of one or more LPP messages between the location server and the target device. The general format of an LPP message consists of a set of common fields followed by a body. The body (which may be empty) contains information specific to a particular message type. Each message type contains information specific to one or more positioning methods and/or information common to all positioning methods.

An LPP session generally includes at least a capability transfer or indication procedure, an assistance data transfer or delivery procedure, and a location information transfer or delivery procedure. FIG. 5 illustrates an example LPP capability transfer procedure 510, LPP assistance data transfer procedure 530, and LPP location information transfer procedure 550 between a target device (labeled "Target") and a location server (labeled "Server"), according to aspects of the disclosure.

The purpose of an LPP capability transfer procedure 510 is to enable the transfer of capabilities from the target device (e.g., a UE 204) to the location server (e.g., an LMF 270). Capabilities in this context refer to positioning and protocol capabilities related to LPP and the positioning methods supported by LPP. In the LPP capability transfer procedure 510, the location server (e.g., an LMF 270) indicates the types of capabilities needed from the target device (e.g., UE 204) in an LPP Request Capabilities message. The target device responds with an LPP Provide Capabilities message. The capabilities included in the LPP Provide Capabilities message should correspond to any capability types specified in the LPP Request Capabilities message. Specifically, for each positioning method for which a request for capabilities is included in the LPP Request Capabilities message, if the target device supports this positioning method, the target device includes the capabilities of the target device for that supported positioning method in the LPP Provide Capabilities message. For an LPP capability indication procedure, the target device provides unsolicited (i.e., without receiving an LPP Request Capabilities message) capabilities to the location server in an LPP Provide Capabilities message.

The purpose of an LPP assistance data transfer procedure 530 is to enable the target device to request assistance data from the location server to assist in positioning, and to enable the location server to transfer assistance data to the target device in the absence of a request. In the LPP assistance data transfer procedure 530, the target device sends an LPP Request Assistance Data message to the location server. The location server responds to the target device with an LPP Provide Assistance Data message containing assistance data. The transferred assistance data should match or be a subset of the assistance data requested in the LPP Request Assistance Data. The location server may also provide any not requested information that it considers useful to the target device. The location server may also transmit one or more additional LPP Provide Assistance Data messages to the target device containing further assistance data. For an LPP assistance data delivery procedure, the location server provides unsolicited assistance data necessary for positioning. The assistance data may be provided periodically or non-periodically.

The purpose of an LPP location information transfer procedure 550 is to enable the location server to request location measurement data and/or a location estimate from the target device, and to enable the target device to transfer location measurement data and/or a location estimate to a location server in the absence of a request. In an LPP location information transfer procedure 550, the location server sends an LPP Request Location Information message to the target device to request location information, indicating the type of location information needed and potentially the associated QoS. The target device responds with an LPP Provide Location Information message to the location server to transfer location information. The location information transferred should match or be a subset of the location information requested by the LPP Request Location Information unless the location server explicitly allows additional location information. More specifically, if the requested information is compatible with the target device's capabilities and configuration, the target device includes the requested information in an LPP Provide Location Information message. Otherwise, if the target device does not support one or more of the requested positioning methods, the target device continues to process the message as if it contained only information for the supported positioning methods and handles the signaling content of the unsupported positioning methods by LPP error detection. If requested by the LPP Request Lactation Information message, the target device sends additional LPP Provide Location Information messages to the location server to transfer additional location information. An LPP location information delivery procedure supports the delivery of positioning estimations based on unsolicited service.

LPP also defines procedures related to error indication for when a receiving endpoint (target device or location server) receives erroneous or unexpected data or detects that certain data are missing. Specifically, when a receiving endpoint determines that a received LPP message contains an error, it can return an Error message to the transmitting endpoint indicating the error or errors and discard the received/erroneous message. If the receiving endpoint is able to determine that the erroneous LPP message is an LPP Error or Abort Message, then the receiving endpoint discards the received message without returning an Error message to the transmitting endpoint.

LPP also defines procedures related to abort indication to allow a target device or location server to abort an ongoing procedure due to some unexpected event (e.g., cancellation of a location request by an LCS client). An Abort procedure can also be used to stop an ongoing procedure (e.g., periodic location reporting from the target device). In an Abort procedure, a first endpoint determines that procedure P must be aborted and sends an Abort message to a second endpoint carrying the transaction ID for procedure P. The second endpoint then aborts procedure P.

Figure 6:
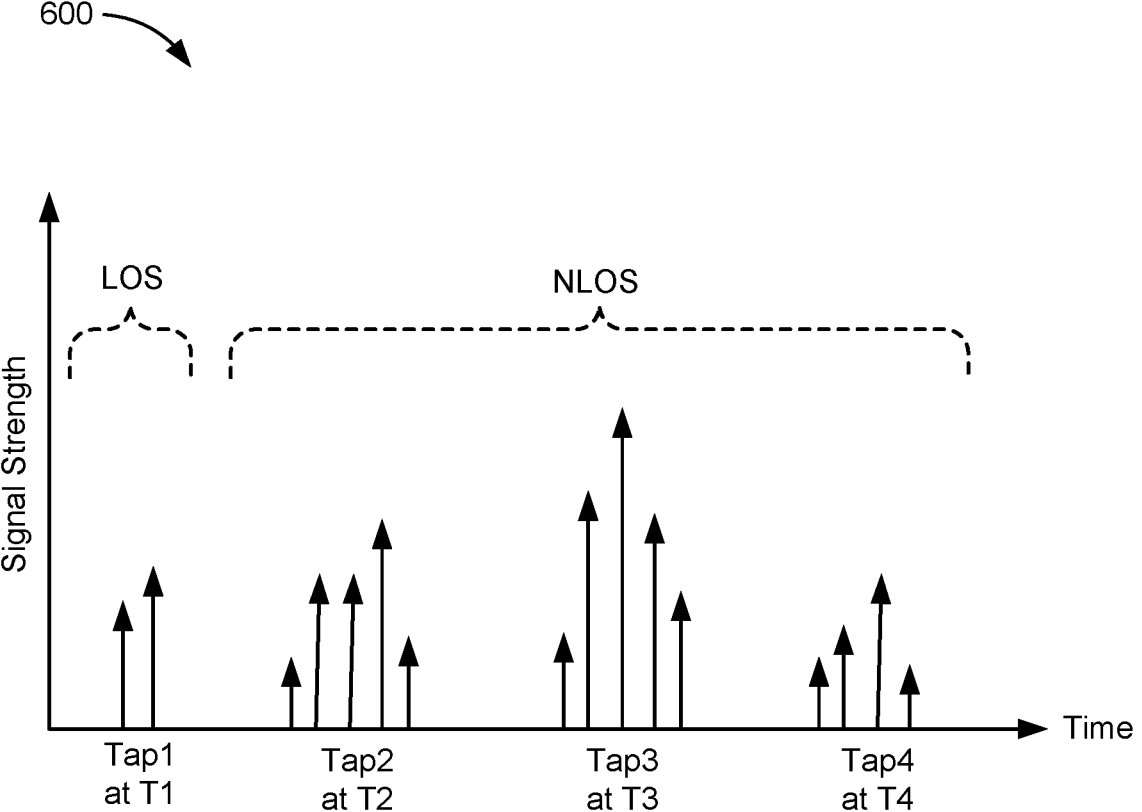
FIG. 6 is a graph representing an example channel estimate of a multipath channel between a receiver device and a transmitter device, according to aspects of the disclosure.

FIG. 6 is a graph 600 representing an example channel estimate of a multipath channel between a receiver device (e.g., any of the UEs or base stations described herein) and a transmitter device (e.g., any other of the UEs or base stations described herein), according to aspects of the disclosure. The channel estimate represents the intensity of a radio frequency (RF) signal (e.g., a positioning reference signal (PRS)) received through a multipath channel as a function of time delay, and may be referred to as the channel energy response (CER), channel impulse response (CIR), or power delay profile (PDP) of the channel. Thus, the horizontal axis represents time (e.g., milliseconds) and the vertical axis represents signal strength (e.g., decibels). Note that a multipath channel is a channel between a transmitter and a receiver over which an RF signal follows multiple paths, or multipaths, due to transmission of the RF signal on multiple beams and/or to the propagation characteristics of the RF signal (e.g., reflection, refraction, etc.).

In the example of FIG. 6, the receiver detects/measures multiple (four) channel taps of the RF signal. Each channel tap is a cluster of one or more rays and corresponds to a multipath that the RF signal followed between the transmitter and the receiver. Thus, a channel tap represents the time of arrival and signal strength of an RF signal over a multipath. There may be multiple channel taps due to the RF signal being transmitted on different transmit beams (and therefore at different angles), or because of the propagation characteristics of RF signals (e.g., potentially following different paths due to reflections), or both. Note that although FIG. 6 illustrates channel taps of two to five rays, as will be appreciated, the channel taps may have more or fewer than the illustrated number of rays.

In the example of FIG. 6, the channel tap detected at time T3 is composed of stronger rays than the channel tap detected at time T1. This may be due to an obstruction on the line of sight (LOS) path between the transmitter and the receiver. Alternatively or additionally, there may be a strong reflector along the non-line of sight (NLOS) path corresponding to the channel tap detected at time T3.

Positioning performance evaluations inside retail stores, warehouses, and other indoor environments make use of computer-aided drafting (CAD) models to generate highly realistic channel profiles by tracing the rays, or trajectories, followed by electromagnetic transmissions of and/or between UEs, base stations, access points, and other transmitters. However, ray tracing for channel modelling, and in turn for positioning of target devices (i.e., mobile devices to be positioned), is computationally expensive. It can take up to several hours of runtime to simulate the channels between a few access points and target devices.

To optimize performance, speed, and reduce redundancies in computation, the present disclosure provides alternative techniques for channel modelling (e.g., low-compute modelling), along with associated criteria, to reduce reliance on ray tracing techniques. The list of criteria may be used as a basis for switching between aggressive ray tracing and non-ray tracing channel models (e.g., low-compute channel models). Low-compute channel models that may be used include specific statistical channel models or more deterministic channel models that have been fitted to a given dataset a priori. A low-compute channel model (also referred to as a low-complexity channel model) may also be to reuse the most recent channel profile for a given target device and incorporate additional small-scale fading effects on the basis of coherence time, mobility, etc.

The disclosed framework may also be used for digital twin scenarios. A digital twin is a digital model of an intended or actual real-world physical product, system, or process (the physical twin of the digital twin) that serves as the effectively indistinguishable digital counterpart of its physical twin for practical purposes, such as simulation, integration, testing, monitoring, and maintenance. Apart from simulation, digital-twin scenarios can alternate between ray tracing and non-ray tracing (e.g., low-compute) channel models for position estimation.

The following are criteria that may be used to determine whether a low-compute channel model, or other non-ray tracing channel model, may be employed in place of a ray tracing channel model for channel profile estimation. The first criterion is the local scattering environment. Given prior knowledge of the environment layout (such as a CAD model of a warehouse) in which a target device or one or more access points are located, the potential impact to the channel profile and consequent positioning performance may be gauged. For example, if a threshold density of scattering objects are located in the vicinity of the target device, then it may be expected that there will be a significant number of multipath components in the channel estimate(s) obtained by the target device, which in turn could degrade ToA and AoA estimation performance. In such cases, proceeding with a complete ray tracing simulation may be appropriate.

A second criterion is the LoS detection and Rician factor estimation. Using visual images (e.g., by placing a camera, such as in graphics engines) or low-compute geometric checks, the presence of a clear LoS link may be detected between the transmitter device and the receiver device. Further, the knowledge of the scattering environment may be used to estimate a Rician factor. Rician fading is a stochastic model for electromagnetic propagation anomaly caused by partial cancellation of an RF signal by itself. That is, the signal arrives at the receiver device over several different paths (exhibiting multipath interference), and at least one of the paths is changing (lengthening or shortening). Rician fading occurs when one of the paths, typically the LoS path is much stronger than the others. If the Rician factor is above a threshold, the channel may be considered to have a strong LoS component and a low-compute channel model may be employed in place of ray-tracing. The materials of obstructors to the LoS component may also be used to look-up a corresponding shadowing loss factor while computing the strength of the LoS component.

A third criterion is the distribution of access points with respect to the target device. In a scenario where a threshold number of access points are favorably located around the target device (resulting in a lower dilution of precision), position accuracy is expected to be high (if there is no significant density of local scatterers) and a low-compute channel model, or other non-ray tracing channel model, may be used.

A fourth criterion is the desired/achievable positioning accuracy. Following the above point, a low-compute channel model, or other non-ray tracing channel model, may be used when the conditions are favorable to achieving a minimum desired position estimation accuracy. For instance, in low bandwidth scenarios, the positioning performance may be lower-bounded by the bandwidth and scenarios where precise multipath components may simply be combined into a single tap (due to low symbol duration). In such cases, simulating the precise multipath components using ray tracing may not provide sufficient benefit over a non-ray tracing channel model.

A fifth criterion is the desired position estimation rate. The rate at which a position is to be estimated may be used as a basis for toggling between ray tracing and non-ray tracing (e.g., low-compute) channel models. This may also be interpreted as how finely a user trajectory is sampled for an estimate. Further details regarding this criterion are provided below.

Referring in greater detail to the non-ray tracing channel models (e.g., low-compute channel models) that may be used, as a first approach, the non-ray tracing/low-compute model may be a statistical channel model or another channel model derived from a dataset. For a given link between a transmitter and a receiver, instead of performing a ray tracing simulation (where a waveform is simulated to traverse along a path and RF propagation equations are solved), the channel profile may be generated using a channel model. Here, the channel model may simply be a statistical model that is specified in a wireless communications standard, or a custom model that is fitted to a dataset. For example, the dataset could be field logs or past ray tracing measurements that have been stored.

A second approach, a previous channel profile determined by a ray tracing channel model may be reused, but with additional randomness introduced to model the current channel profile. That is, the non-ray tracing/low-compute channel model may be a model based on a previous ray tracing model but with additional randomness introduced. As will be appreciated, one or more of the above approaches may be used to generate a channel profile for a target device.

Figure 7:
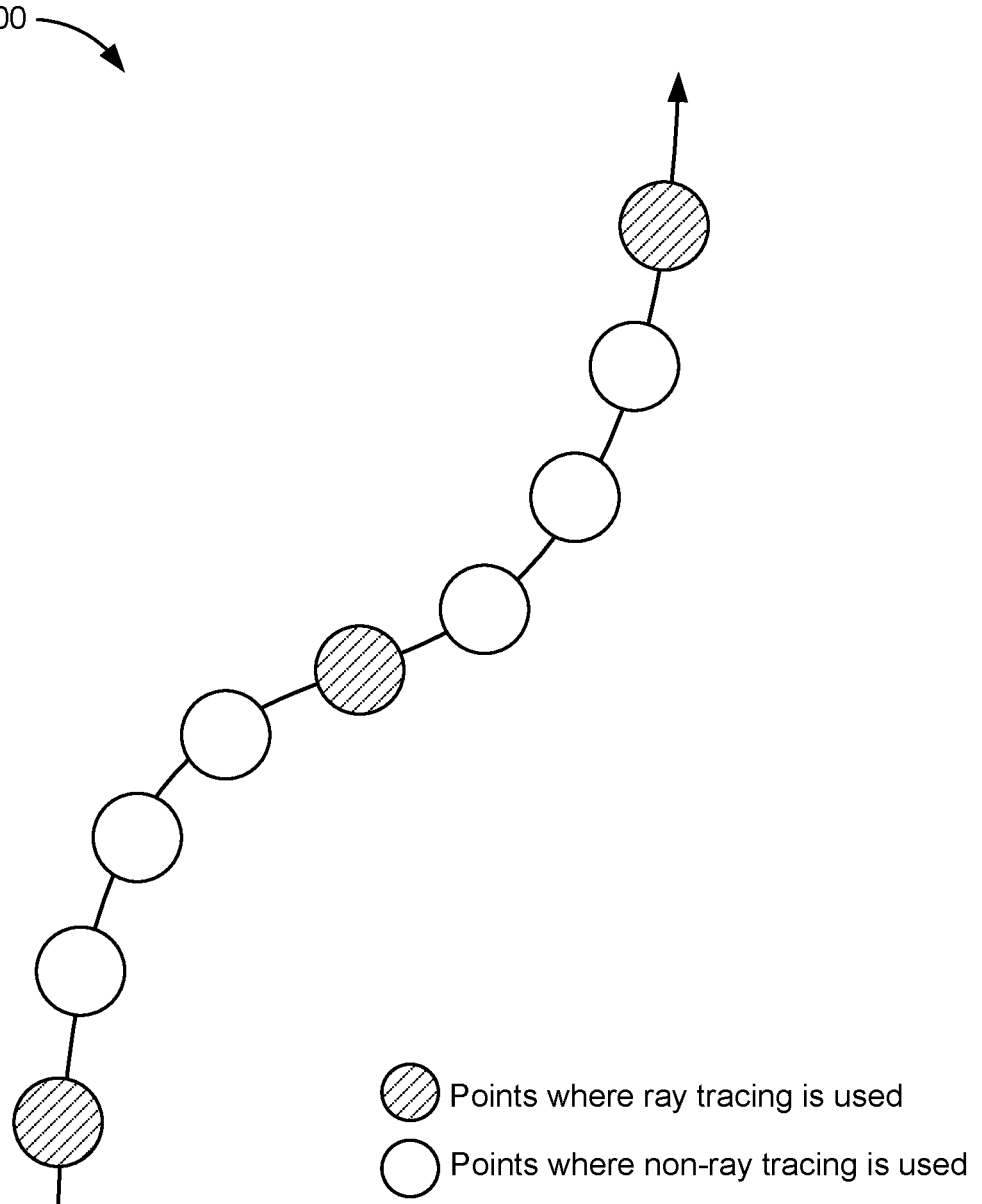
FIG. 7 is a diagram illustrating an example of using both a ray tracing channel model and one or more non-ray tracing channel models to generate channel profiles for a target device, according to aspects of the disclosure.

FIG. 7 is a diagram 700 illustrating an example of using both a ray tracing channel model and one or more non-ray tracing channel models to generate channel profiles for a target device, according to aspects of the disclosure. As shown in FIG. 7, in some cases, for a given target device, ray tracing may be used to generate the channel profile in a periodic manner. This may indicate or correspond to how finely the target device trajectory is sampled for a position estimate or for tracking purposes. In between the periodically-determined ray tracing-based channel profiles, additional channel profiles may be generated using one or more non-ray tracing channel models (e.g., a low-compute channel models), so as to model, for example, small-scale fading effects.

Various parameters may impact the generation of the channel profiles by the one or more non-ray tracing channel models. One parameter is the velocity vector of the target device. The velocity (speed) of the target device may be estimated as the ratio of the distance between the points where ray tracing was performed to the time duration between the points. The direction between points may be given by the slope of the line connecting the two points. The lower the velocity, the more frequent it may be beneficial to generate additional channel profiles using one or more non-ray tracing channel models.

Another parameter is the material and distribution of local scatterers around the target device. For example, the more scatterers around the target device, the more frequent it may be beneficial to generate additional channel profiles using one or more non-ray tracing channel models.

Referring in greater detail to the selection between ray tracing and non-ray tracing methods of generating channel profiles, the selection entity uses the selected approach to estimate a position of a target device, simulate a positioning scenario, train an AI/ML positioning model, and/or generate or calibrate a digital twin for positioning. The selection entity may be a wireless device (e.g., a UE, TRP, gNB, or other wireless network node) or a network entity (e.g., an LMF, sensing management function (SnMF), AMF, over-the-top (OTT) server, etc.).

Additional channel profiles (and subsequent measurements for positioning) may be augmented (along the trajectory of a target device) using either ray tracing or non-ray tracing channel models given, for example, the knowledge of a digital twin. Other side information, such as inertial measurement unit (IMU) measurements, could influence the estimated trajectory of a target device, and therefore, which types of channel profiles may be generated (i.e., ray tracing or non-ray tracing).

Referring to the selection criteria in greater detail, the selection criteria may be determined and signaled as follows. In some cases, a network entity may signal/configure the selection criteria to a wireless device using one or more broadcast messages (e.g., positioning SIBs, sensing SIBs, etc.), assistance data transfer (e.g., an LPP Provide Assistance Data message, an LPP Request Location Information message, or the like), RRC signaling, or the like. The network entity may then activate one of the criteria using, for example, an LPP Request Location Information message, one or more MAC control elements (MAC-CEs), downlink control information (DCI) signaling, or the like.

In some cases, a wireless device may signal to a network entity the desired selection criteria using a request message (e.g., an LPP Request Assistance Data message, a New Radio Positioning Protocol type A (NRPPa) request message, or the like). The wireless device may request the specific selection criteria because the wireless device may be in a better situation to determine the applicable/desired criteria.

In some cases, the wireless device may indicate its capability to perform ray tracing and/or non-ray tracing channel profile modelling, along with its capability to switch between them. The wireless device may indicate these capabilities using, for example, an LPP Provide Capabilities message (if the wireless device is a UE) or an NRPPa TRP Information message (if the wireless device is a base station or a component of a base station).

In some cases, the selection criteria between ray tracing and non-ray tracing channel modelling approaches may consider validity and/or granularity conditions. In some cases, the configured criteria may be associated with a spatial validity condition. For example, the criteria may be associated with an area ID, meaning that the entity selecting and/or applying the selection criteria considers the configured criteria in the area (e.g., a geographic area, a set of cells, etc.) indicated by the area ID. In some cases, the configured criteria may be associated with a time validity condition. For example, there may be start/stop times and/or a timer associated with the selection criteria, meaning that the entity selecting and/or applying the selection criteria considers the configured criteria in the timing validity signaled according to the start/stop timing or before expiration of the timer.

FIG. 8 illustrates an example method 800 of communication, according to aspects of the disclosure. In an aspect, method 800 may be performed by an apparatus (e.g., a UE, TRP, gNB, LMF, SnMF, etc.).

At 810, the apparatus determines, based on one or more criteria, to use a non-ray tracing channel model, instead of a ray-tracing-based channel model, to model a wireless channel profile between a UE (e.g., any of the UEs described herein) and one or more network nodes (e.g., one or more TRPs, access points, etc.). In an aspect, where the apparatus is a UE, operation 810 may be performed by the one or more WWAN transceivers 310, the one or more short-range wireless transceivers 320, the one or more processors 342, memory 340, and/or positioning component 348, any or all of which may be considered means for performing this operation. Where the apparatus is a base station or access point, operation 810 may be performed by the one or more WWAN transceivers 350, the one or more short-range wireless transceivers 360, the one or more processors 384, memory 386, and/or positioning component 388, any or all of which may be considered means for performing this operation. Where the apparatus is a network entity, operation 810 may be performed by the one or more network transceivers 390, the one or more processors 394, memory 396, and/or positioning component 398, any or all of which may be considered means for performing this operation.

At 820, the apparatus performs one or more positioning operations associated with the UE and the one or more network nodes based on the wireless channel profile between the UE and the one or more network nodes modeled by the non-ray tracing channel model. In an aspect, where the apparatus is a UE, operation 820 may be performed by the one or more WWAN transceivers 310, the one or more short-range wireless transceivers 320, the one or more processors 342, memory 340, and/or positioning component 348, any or all of which may be considered means for performing this operation. Where the apparatus is a base station or access point, operation 820 may be performed by the one or more WWAN transceivers 350, the one or more short-range wireless transceivers 360, the one or more processors 384, memory 386, and/or positioning component 388, any or all of which may be considered means for performing this operation. Where the apparatus is a network entity, operation 820 may be performed by the one or more network transceivers 390, the one or more processors 394, memory 396, and/or positioning component 398, any or all of which may be considered means for performing this operation.

As will be appreciated, a technical advantage of the method 800 is reduction of the computational requirements of generating channel profiles.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of communication performed by an apparatus, comprising: determining, based on one or more criteria, to use a non-ray tracing channel model, instead of a ray-tracing-based channel model, to model a wireless channel profile between a user equipment (UE) and one or more network nodes; and performing one or more positioning operations associated with the UE and the one or more network nodes based on the wireless channel profile between the UE and the one or more network nodes modeled by the non-ray tracing channel model.

Clause 2. The method of clause 1, wherein: the one or more criteria comprise a number of scattering objects in an environment of the UE and the one or more network nodes, and the non-ray tracing channel model is determined to be used based on the number of scattering objects being less than or equal to a threshold.

Clause 3. The method of any of clauses 1 to 2, wherein: the one or more criteria comprise a likelihood of a presence of a line-of-sight (LoS) path between the UE and the one or more network nodes, and the non-ray tracing channel model is determined to be used based on the likelihood of the presence of the LoS path being greater than or equal to a threshold.

Clause 4. The method of any of clauses 1 to 3, wherein: the one or more criteria comprise a Rician factor associated with the wireless channel profile, and the non-ray tracing channel model is determined to be used based on the Rician factor being greater than or equal to a threshold.

Clause 5. The method of any of clauses 1 to 4, wherein: the one or more criteria comprise a dilution of precision (DOP) associated with the UE and the one or more network nodes, and the non-ray tracing channel model is determined to be used based on the DOP being greater than or equal to a threshold.

Clause 6. The method of any of clauses 1 to 5, wherein: the one or more criteria comprise a positioning accuracy requirement of a positioning session involving the UE and the one or more network nodes, and the non-ray tracing channel model is determined to be used based on the positioning accuracy requirement being less than or equal to a threshold.

Clause 7. The method of any of clauses 1 to 6, wherein: the one or more criteria comprise a rate at which a position of the UE is to be estimated, and the non-ray tracing channel model is determined to be used based on the rate being greater than or equal to a threshold.

Clause 8. The method of any of clauses 1 to 7, wherein the non-ray tracing channel model is: a statistical channel model, a channel model derived from a dataset, or a previous ray-tracing-based channel model with additional randomness.

Clause 9. The method of any of clauses 1 to 8, further comprising: generating periodic wireless channel profiles between the UE and the one or more network nodes using the ray-tracing-based channel model; and generating, between the periodic wireless channel profiles, the wireless channel profile between the UE and the one or more network nodes using the non-ray tracing channel model with additional randomness.

Clause 10. The method of any of clauses 1 to 9, wherein performing the one or more positioning operations comprises: simulating a positioning scenario involving the UE and the one or more network nodes based on the wireless channel profile between the UE and the one or more network nodes modeled by the non-ray tracing channel model; training an artificial intelligence/machine learning (AI/ML) positioning model based on the wireless channel profile between the UE and the one or more network nodes modeled by the non-ray tracing channel model; generating a digital twin for positioning based on the wireless channel profile between the UE and the one or more network nodes modeled by the non-ray tracing channel model; estimating a position of the UE based on the wireless channel profile between the UE and the one or more network nodes modeled by the non-ray tracing channel model; or any combination thereof.

Clause 11. The method of any of clauses 1 to 10, further comprising: receiving a plurality of criteria, including the one or more criteria; and receiving an activation of the one or more criteria.

Clause 12. The method of clause 11, wherein the plurality of criteria is received via: one or more positioning system information blocks (posSIBs), one or more sensing system information blocks (senseSIBs), one or more radio resource control (RRC) messages, a Long-Term Evolution (LTE) positioning protocol (LPP) positioning assistance data message, an LPP request positioning assistance data message, or a New Radio positioning protocol type A (NRPPa) message.

Clause 13. The method of any of clauses 11 to 12, wherein the activation of the one or more criteria are received via: downlink control information (DCI), uplink control information (UCI), a medium access control control element (MAC-CE).

Clause 14. The method of any of clauses 1 to 13, further comprising: transmitting one or more capabilities of the apparatus to use non-ray tracing channel models to model wireless channel profiles.

Clause 15. The method of any of clauses 1 to 14, further comprising: transmitting one or more capabilities of the apparatus to switch between non-ray tracing channel models and ray-tracing-based channel models to model wireless channel profiles.

Clause 16. The method of any of clauses 1 to 15, wherein the one or more criteria are associated with a spatial validity criterion indicating a one or more geographic areas in which the one or more criteria are valid.

Clause 17. The method of any of clauses 1 to 16, wherein the one or more criteria are associated with a time validity criterion indicating a time period during which the one or more criteria are valid.

Clause 18. The method of any of clauses 1 to 17, wherein the apparatus is: the UE, a base station, a location server, or a sensing server.

Clause 19. An apparatus, comprising: one or more memories; and one or more processors communicatively coupled to the one or more memories, the one or more processors, either alone or in combination, configured to: determine, based on one or more criteria, to use a non-ray tracing channel model, instead of a ray-tracing-based channel model, to model a wireless channel profile between a user equipment (UE) and one or more network nodes; and perform one or more positioning operations associated with the UE and the one or more network nodes based on the wireless channel profile between the UE and the one or more network nodes modeled by the non-ray tracing channel model.

Clause 20. The apparatus of clause 19, wherein: the one or more criteria comprise a number of scattering objects in an environment of the UE and the one or more network nodes, and the non-ray tracing channel model is determined to be used based on the number of scattering objects being less than or equal to a threshold.

Clause 21. The apparatus of any of clauses 19 to 20, wherein: the one or more criteria comprise a likelihood of a presence of a line-of-sight (LoS) path between the UE and the one or more network nodes, and the non-ray tracing channel model is determined to be used based on the likelihood of the presence of the LoS path being greater than or equal to a threshold.

Clause 22. The apparatus of any of clauses 19 to 21, wherein: the one or more criteria comprise a Rician factor associated with the wireless channel profile, and the non-ray tracing channel model is determined to be used based on the Rician factor being greater than or equal to a threshold.

Clause 23. The apparatus of any of clauses 19 to 22, wherein: the one or more criteria comprise a dilution of precision (DOP) associated with the UE and the one or more network nodes, and the non-ray tracing channel model is determined to be used based on the DOP being greater than or equal to a threshold.

Clause 24. The apparatus of any of clauses 19 to 23, wherein: the one or more criteria comprise a positioning accuracy requirement of a positioning session involving the UE and the one or more network nodes, and the non-ray tracing channel model is determined to be used based on the positioning accuracy requirement being less than or equal to a threshold.

Clause 25. The apparatus of any of clauses 19 to 24, wherein: the one or more criteria comprise a rate at which a position of the UE is to be estimated, and the non-ray tracing channel model is determined to be used based on the rate being greater than or equal to a threshold.

Clause 26. The apparatus of any of clauses 19 to 25, wherein the non-ray tracing channel model is: a statistical channel model, a channel model derived from a dataset, or a previous ray-tracing-based channel model with additional randomness.

Clause 27. The apparatus of any of clauses 19 to 26, wherein the one or more processors, either alone or in combination, are further configured to: generate periodic wireless channel profiles between the UE and the one or more network nodes using the ray-tracing-based channel model; and generate, between the periodic wireless channel profiles, the wireless channel profile between the UE and the one or more network nodes using the non-ray tracing channel model with additional randomness.

Clause 28. The apparatus of any of clauses 19 to 27, wherein the one or more processors configured to perform the one or more positioning operations comprises the one or more processors, either alone or in combination, configured to: simulate a positioning scenario involving the UE and the one or more network nodes based on the wireless channel profile between the UE and the one or more network nodes modeled by the non-ray tracing channel model; train an artificial intelligence/machine learning (AI/ML) positioning model based on the wireless channel profile between the UE and the one or more network nodes modeled by the non-ray tracing channel model; generate a digital twin for positioning based on the wireless channel profile between the UE and the one or more network nodes modeled by the non-ray tracing channel model; estimate a position of the UE based on the wireless channel profile between the UE and the one or more network nodes modeled by the non-ray tracing channel model; or any combination thereof.

Clause 29. The apparatus of any of clauses 19 to 28, wherein the one or more processors, either alone or in combination, are further configured to: receive, via one or more transceivers of the apparatus, a plurality of criteria, including the one or more criteria; and receive, via the one or more transceivers, an activation of the one or more criteria.

Clause 30. The apparatus of clause 29, wherein the plurality of criteria is received via: one or more positioning system information blocks (posSIBs), one or more sensing system information blocks (senseSIBs), one or more radio resource control (RRC) messages, a Long-Term Evolution (LTE) positioning protocol (LPP) positioning assistance data message, an LPP request positioning assistance data message, or a New Radio positioning protocol type A (NRPPa) message.

Clause 31. The apparatus of any of clauses 29 to 30, wherein the activation of the one or more criteria are received via: downlink control information (DCI), uplink control information (UCI), a medium access control control element (MAC-CE).

Clause 32. The apparatus of any of clauses 19 to 31, wherein the one or more processors, either alone or in combination, are further configured to: transmit, via one or more transceivers of the apparatus, one or more capabilities of the apparatus to use non-ray tracing channel models to model wireless channel profiles.

Clause 33. The apparatus of any of clauses 19 to 32, wherein the one or more processors, either alone or in combination, are further configured to: transmit, via one or more transceivers of the apparatus, one or more capabilities of the apparatus to switch between non-ray tracing channel models and ray-tracing-based channel models to model wireless channel profiles.

Clause 34. The apparatus of any of clauses 19 to 33, wherein the one or more criteria are associated with a spatial validity criterion indicating a one or more geographic areas in which the one or more criteria are valid.

Clause 35. The apparatus of any of clauses 19 to 34, wherein the one or more criteria are associated with a time validity criterion indicating a time period during which the one or more criteria are valid.

Clause 36. The apparatus of any of clauses 19 to 35, wherein the apparatus is: the UE, a base station, a location server, or a sensing server.

Clause 37. An apparatus, comprising: means for determining, based on one or more criteria, to use a non-ray tracing channel model, instead of a ray-tracing-based channel model, to model a wireless channel profile between a user equipment (UE) and one or more network nodes; and means for performing one or more positioning operations associated with the UE and the one or more network nodes based on the wireless channel profile between the UE and the one or more network nodes modeled by the non-ray tracing channel model.

Clause 38. The apparatus of clause 37, wherein: the one or more criteria comprise a number of scattering objects in an environment of the UE and the one or more network nodes, and the non-ray tracing channel model is determined to be used based on the number of scattering objects being less than or equal to a threshold.

Clause 39. The apparatus of any of clauses 37 to 38, wherein: the one or more criteria comprise a likelihood of a presence of a line-of-sight (LoS) path between the UE and the one or more network nodes, and the non-ray tracing channel model is determined to be used based on the likelihood of the presence of the LoS path being greater than or equal to a threshold.

Clause 40. The apparatus of any of clauses 37 to 39, wherein: the one or more criteria comprise a Rician factor associated with the wireless channel profile, and the non-ray tracing channel model is determined to be used based on the Rician factor being greater than or equal to a threshold.

Clause 41. The apparatus of any of clauses 37 to 40, wherein: the one or more criteria comprise a dilution of precision (DOP) associated with the UE and the one or more network nodes, and the non-ray tracing channel model is determined to be used based on the DOP being greater than or equal to a threshold.

Clause 42. The apparatus of any of clauses 37 to 41, wherein: the one or more criteria comprise a positioning accuracy requirement of a positioning session involving the UE and the one or more network nodes, and the non-ray tracing channel model is determined to be used based on the positioning accuracy requirement being less than or equal to a threshold.

Clause 43. The apparatus of any of clauses 37 to 42, wherein: the one or more criteria comprise a rate at which a position of the UE is to be estimated, and the non-ray tracing channel model is determined to be used based on the rate being greater than or equal to a threshold.

Clause 44. The apparatus of any of clauses 37 to 43, wherein the non-ray tracing channel model is: a statistical channel model, a channel model derived from a dataset, or a previous ray-tracing-based channel model with additional randomness.

Clause 45. The apparatus of any of clauses 37 to 44, further comprising: means for generating periodic wireless channel profiles between the UE and the one or more network nodes using the ray-tracing-based channel model; and means for generating, between the periodic wireless channel profiles, the wireless channel profile between the UE and the one or more network nodes using the non-ray tracing channel model with additional randomness.

Clause 46. The apparatus of any of clauses 37 to 45, wherein the means for performing the one or more positioning operations comprises: means for simulating a positioning scenario involving the UE and the one or more network nodes based on the wireless channel profile between the UE and the one or more network nodes modeled by the non-ray tracing channel model; means for training an artificial intelligence/machine learning (AI/ML) positioning model based on the wireless channel profile between the UE and the one or more network nodes modeled by the non-ray tracing channel model; means for generating a digital twin for positioning based on the wireless channel profile between the UE and the one or more network nodes modeled by the non-ray tracing channel model; means for estimating a position of the UE based on the wireless channel profile between the UE and the one or more network nodes modeled by the non-ray tracing channel model; or any combination thereof.

Clause 47. The apparatus of any of clauses 37 to 46, further comprising: means for receiving a plurality of criteria, including the one or more criteria; and means for receiving an activation of the one or more criteria.

Clause 48. The apparatus of clause 47, wherein the plurality of criteria is received via: one or more positioning system information blocks (posSIBs), one or more sensing system information blocks (senseSIBs), one or more radio resource control (RRC) messages, a Long-Term Evolution (LTE) positioning protocol (LPP) positioning assistance data message, an LPP request positioning assistance data message, or a New Radio positioning protocol type A (NRPPa) message.

Clause 49. The apparatus of any of clauses 47 to 48, wherein the activation of the one or more criteria are received via: means for downlinking control information (DCI), means for uplinking control information (UCI), a medium access control control element (MAC-CE).

Clause 50. The apparatus of any of clauses 37 to 49, further comprising: means for transmitting one or more capabilities of the apparatus to use non-ray tracing channel models to model wireless channel profiles.

Clause 51. The apparatus of any of clauses 37 to 50, further comprising: means for transmitting one or more capabilities of the apparatus to switch between non-ray tracing channel models and ray-tracing-based channel models to model wireless channel profiles.

Clause 52. The apparatus of any of clauses 37 to 51, wherein the one or more criteria are associated with a spatial validity criterion indicating a one or more geographic areas in which the one or more criteria are valid.

Clause 53. The apparatus of any of clauses 37 to 52, wherein the one or more criteria are associated with a time validity criterion indicating a time period during which the one or more criteria are valid.

Clause 54. The apparatus of any of clauses 37 to 53, wherein the apparatus is: the UE, a base station, a location server, or a sensing server.

Clause 55. A non-transitory computer-readable medium storing computer-executable instructions that, when executed by an apparatus, cause the apparatus to: determine, based on one or more criteria, to use a non-ray tracing channel model, instead of a ray-tracing-based channel model, to model a wireless channel profile between a user equipment (UE) and one or more network nodes; and perform one or more positioning operations associated with the UE and the one or more network nodes based on the wireless channel profile between the UE and the one or more network nodes modeled by the non-ray tracing channel model.

Clause 56. The non-transitory computer-readable medium of clause 55, wherein: the one or more criteria comprise a number of scattering objects in an environment of the UE and the one or more network nodes, and the non-ray tracing channel model is determined to be used based on the number of scattering objects being less than or equal to a threshold.

Clause 57. The non-transitory computer-readable medium of any of clauses 55 to 56, wherein: the one or more criteria comprise a likelihood of a presence of a line-of-sight (LoS) path between the UE and the one or more network nodes, and the non-ray tracing channel model is determined to be used based on the likelihood of the presence of the LoS path being greater than or equal to a threshold.

Clause 58. The non-transitory computer-readable medium of any of clauses 55 to 57, wherein: the one or more criteria comprise a Rician factor associated with the wireless channel profile, and the non-ray tracing channel model is determined to be used based on the Rician factor being greater than or equal to a threshold.

Clause 59. The non-transitory computer-readable medium of any of clauses 55 to 58, wherein: the one or more criteria comprise a dilution of precision (DOP) associated with the UE and the one or more network nodes, and the non-ray tracing channel model is determined to be used based on the DOP being greater than or equal to a threshold.

Clause 60. The non-transitory computer-readable medium of any of clauses 55 to 59, wherein: the one or more criteria comprise a positioning accuracy requirement of a positioning session involving the UE and the one or more network nodes, and the non-ray tracing channel model is determined to be used based on the positioning accuracy requirement being less than or equal to a threshold.

Clause 61. The non-transitory computer-readable medium of any of clauses 55 to 60, wherein: the one or more criteria comprise a rate at which a position of the UE is to be estimated, and the non-ray tracing channel model is determined to be used based on the rate being greater than or equal to a threshold.

Clause 62. The non-transitory computer-readable medium of any of clauses 55 to 61, wherein the non-ray tracing channel model is: a statistical channel model, a channel model derived from a dataset, or a previous ray-tracing-based channel model with additional randomness.

Clause 63. The non-transitory computer-readable medium of any of clauses 55 to 62, further comprising computer-executable instructions that, when executed by the apparatus, cause the apparatus to: generate periodic wireless channel profiles between the UE and the one or more network nodes using the ray-tracing-based channel model; and generate, between the periodic wireless channel profiles, the wireless channel profile between the UE and the one or more network nodes using the non-ray tracing channel model with additional randomness.

Clause 64. The non-transitory computer-readable medium of any of clauses 55 to 63, wherein the computer-executable instructions that, when executed by the apparatus, cause the apparatus to perform the one or more positioning operations comprise computer-executable instructions that, when executed by the apparatus, cause the apparatus to: simulate a positioning scenario involving the UE and the one or more network nodes based on the wireless channel profile between the UE and the one or more network nodes modeled by the non-ray tracing channel model; train an artificial intelligence/machine learning (AI/ML) positioning model based on the wireless channel profile between the UE and the one or more network nodes modeled by the non-ray tracing channel model; generate a digital twin for positioning based on the wireless channel profile between the UE and the one or more network nodes modeled by the non-ray tracing channel model; estimate a position of the UE based on the wireless channel profile between the UE and the one or more network nodes modeled by the non-ray tracing channel model; or any combination thereof.

Clause 65. The non-transitory computer-readable medium of any of clauses 55 to 64, further comprising computer-executable instructions that, when executed by the apparatus, cause the apparatus to: receive a plurality of criteria, including the one or more criteria; and receive an activation of the one or more criteria.

Clause 66. The non-transitory computer-readable medium of clause 65, wherein the plurality of criteria is received via: one or more positioning system information blocks (posSIBs), one or more sensing system information blocks (senseSIBs), one or more radio resource control (RRC) messages, a Long-Term Evolution (LTE) positioning protocol (LPP) positioning assistance data message, an LPP request positioning assistance data message, or a New Radio positioning protocol type A (NRPPa) message.

Clause 67. The non-transitory computer-readable medium of any of clauses 65 to 66, wherein the activation of the one or more criteria are received via: downlink control information (DCI), uplink control information (UCI), a medium access control control element (MAC-CE).

Clause 68. The non-transitory computer-readable medium of any of clauses 55 to 67, further comprising computer-executable instructions that, when executed by the apparatus, cause the apparatus to: transmit one or more capabilities of the apparatus to use non-ray tracing channel models to model wireless channel profiles.

Clause 69. The non-transitory computer-readable medium of any of clauses 55 to 68, further comprising computer-executable instructions that, when executed by the apparatus, cause the apparatus to: transmit one or more capabilities of the apparatus to switch between non-ray tracing channel models and ray-tracing-based channel models to model wireless channel profiles.

Clause 70. The non-transitory computer-readable medium of any of clauses 55 to 69, wherein the one or more criteria are associated with a spatial validity criterion indicating a one or more geographic areas in which the one or more criteria are valid.

Clause 71. The non-transitory computer-readable medium of any of clauses 55 to 70, wherein the one or more criteria are associated with a time validity criterion indicating a time period during which the one or more criteria are valid.

Clause 72. The non-transitory computer-readable medium of any of clauses 55 to 71, wherein the apparatus is: the UE, a base station, a location server, or a sensing server.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

43

What is claimed is:

1. An apparatus, comprising:
one or more memories; and
one or more processors communicatively coupled to the
one or more memories, the one or more processors,
either alone or in combination, configured to:
determine, based on one or more criteria, to use a
non-ray tracing channel model, instead of a ray-
tracing-based channel model, to model a wireless
channel profile between a user equipment (UE) and
one or more network nodes; and
perform one or more positioning operations associated
with the UE and the one or more network nodes
based on the wireless channel profile between the UE
and the one or more network nodes modeled by the
non-ray tracing channel model.

2. The apparatus of claim 1, wherein:
the one or more criteria comprise a number of scattering
objects in an environment of the UE and the one or
more network nodes, and
the non-ray tracing channel model is determined to be
used based on the number of scattering objects being
less than or equal to a threshold.

3. The apparatus of claim 1, wherein:
the one or more criteria comprise a likelihood of a
presence of a line-of-sight (LoS) path between the UE
and the one or more network nodes, and
the non-ray tracing channel model is determined to be
used based on the likelihood of the presence of the LoS
path being greater than or equal to a threshold.

4. The apparatus of claim 1, wherein:
the one or more criteria comprise a Rician factor associ-
ated with the wireless channel profile, and
the non-ray tracing channel model is determined to be
used based on the Rician factor being greater than or
equal to a threshold.

5. The apparatus of claim 1, wherein:
the one or more criteria comprise a dilution of precision
(DOP) associated with the UE and the one or more
network nodes, and
the non-ray tracing channel model is determined to be
used based on the DOP being greater than or equal to
a threshold.

6. The apparatus of claim 1, wherein:
the one or more criteria comprise a positioning accuracy
requirement of a positioning session involving the UE
and the one or more network nodes, and
the non-ray tracing channel model is determined to be
used based on the positioning accuracy requirement
being less than or equal to a threshold.

7. The apparatus of claim 1, wherein:
the one or more criteria comprise a rate at which a
position of the UE is to be estimated, and
the non-ray tracing channel model is determined to be
used based on the rate being greater than or equal to a
threshold.

8. The apparatus of claim 1, wherein the non-ray tracing
channel model is:
a statistical channel model,
a channel model derived from a dataset, or
a previous ray-tracing-based channel model with addi-
tional randomness.

9. The apparatus of claim 1, wherein the one or more
processors, either alone or in combination, are further con-
figured to:

44 generate periodic wireless channel profiles between the
UE and the one or more network nodes using the
ray-tracing-based channel model; and
generate, between the periodic wireless channel profiles,
the wireless channel profile between the UE and the
one or more network nodes using the non-ray tracing
channel model with additional randomness.

10. The apparatus of claim 1, wherein the one or more
processors configured to perform the one or more position-
ing operations comprises the one or more processors, either
alone or in combination, configured to:
simulate a positioning scenario involving the UE and the
one or more network nodes based on the wireless
channel profile between the UE and the one or more
network nodes modeled by the non-ray tracing channel
model;
train an artificial intelligence/machine learning (AI/ML)
positioning model based on the wireless channel profile
between the UE and the one or more network nodes
modeled by the non-ray tracing channel model;
generate a digital twin for positioning based on the
wireless channel profile between the UE and the one or
more network nodes modeled by the non-ray tracing
channel model;
estimate a position of the UE based on the wireless
channel profile between the UE and the one or more
network nodes modeled by the non-ray tracing channel
model; or
any combination thereof.

11. The apparatus of claim 1, wherein the one or more
processors, either alone or in combination, are further con-
figured to:
receive, via one or more transceivers of the apparatus, a
plurality of criteria, including the one or more criteria;
and
receive, via the one or more transceivers, an activation of
the one or more criteria.

12. The apparatus of claim 11, wherein the plurality of
criteria is received via:
one or more positioning system information blocks (pos-
SIBs),
one or more sensing system information blocks
(senseSIBs),
one or more radio resource control (RRC) messages,
a Long-Term Evolution (LTE) positioning protocol (LPP)
positioning assistance data message,
an LPP request positioning assistance data message, or
a New Radio positioning protocol type A (NRPPa) mes-
sage.

13. The apparatus of claim 11, wherein the activation of
the one or more criteria are received via:
downlink control information (DCI),
uplink control information (UCI),
a medium access control control element (MAC-CE).

14. The apparatus of claim 1, wherein the one or more
processors, either alone or in combination, are further con-
figured to:
transmit, via one or more transceivers of the apparatus,
one or more capabilities of the apparatus to use non-ray
tracing channel models to model wireless channel
profiles.

15. The apparatus of claim 1, wherein the one or more
processors, either alone or in combination, are further con-
figured to:
transmit, via one or more transceivers of the apparatus,
one or more capabilities of the apparatus to switch between non-ray tracing channel models and ray-tracing-based channel models to model wireless channel profiles.

16. The apparatus of claim 1, wherein the one or more criteria are associated with a spatial validity criterion indicating a one or more geographic areas in which the one or more criteria are valid.

17. The apparatus of claim 1, wherein the one or more criteria are associated with a time validity criterion indicating a time period during which the one or more criteria are valid.

18. The apparatus of claim 1, wherein the apparatus is:

the UE, a base station, a location server, or a sensing server.

19. A method of communication performed by an apparatus, comprising:

determining, based on one or more criteria, to use a non-ray tracing channel model, instead of a ray-tracingbased channel model, to model a wireless channel profile between a user equipment (UE) and one or more network nodes; and performing one or more positioning operations associated with the UE and the one or more network nodes based on the wireless channel profile between the UE and the one or more network nodes modeled by the non-ray tracing channel model.

20. A non-transitory computer-readable medium storing computer-executable instructions that, when executed by an apparatus, cause the apparatus to:

determine, based on one or more criteria, to use a non-ray tracing channel model, instead of a ray-tracing-based channel model, to model a wireless channel profile between a user equipment (UE) and one or more network nodes; and perform one or more positioning operations associated with the UE and the one or more network nodes based on the wireless channel profile between the UE and the one or more network nodes modeled by the non-ray tracing channel model.

\* \* \* \* \*